(12) United States Patent
Bryan et al.

(10) Patent No.: US 9,243,196 B2
(45) Date of Patent: Jan. 26, 2016

(54) PROCESS USING NATURAL GAS PARTIAL OXIDATION TO CONDITION SYNGAS FROM GASIFICATION OF OTHER FUELS

(71) Applicants: Bruce G. Bryan, Wilmette, IL (US); Arunabha Basu, Aurora, IL (US); Howard S. Meyer, Hoffman Estates, IL (US)

(72) Inventors: Bruce G. Bryan, Wilmette, IL (US); Arunabha Basu, Aurora, IL (US); Howard S. Meyer, Hoffman Estates, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 14/640,362

(22) Filed: Mar. 6, 2015

(65) Prior Publication Data

US 2015/0299589 A1    Oct. 22, 2015

Related U.S. Application Data

(60) Provisional application No. 61/981,876, filed on Apr. 21, 2014.

(51) Int. Cl.
| | |
|---|---|
| *C01B 3/38* | (2006.01) |
| *C10J 3/72* | (2006.01) |
| *C01B 3/14* | (2006.01) |
| *C01B 3/48* | (2006.01) |
| *C01B 3/22* | (2006.01) |

(52) U.S. Cl.
CPC ... *C10J 3/72* (2013.01); *C01B 3/14* (2013.01); *C01B 3/22* (2013.01); *C01B 3/48* (2013.01); *C01B 2203/0205* (2013.01); *C01B 2203/025* (2013.01); *C01B 2203/0266* (2013.01); *C01B 2203/0283* (2013.01); *C01B 2203/1276* (2013.01); *C01B 2203/142* (2013.01); *C10J 2300/093* (2013.01); *C10J 2300/0916* (2013.01); *C10J 2300/0943* (2013.01); *C10J 2300/0946* (2013.01)

(58) Field of Classification Search
USPC .......................................... 252/373
See application file for complete search history.

(56) References Cited

U.S. PATENT DOCUMENTS

2010/0237291 A1*  9/2010  Simmons .................. C01B 3/22
                                                                        252/373

* cited by examiner

*Primary Examiner* — Melvin C Mayes
*Assistant Examiner* — Kenneth Vaden
(74) *Attorney, Agent, or Firm* — Pauley Erickson & Kottis

(57) ABSTRACT

A method of processing synthesis gas improves the quality of the synthesis gas by using a water gas shift reaction to increase the molar ratio of hydrogen to carbon monoxide ($H_2$:CO) in an efficient manner. A first steam of hot natural gas-based synthesis gas having a first higher molar ratio of $H_2$:CO is combined with a second stream of quenched synthesis gas having a second lower molar ratio of $H_2$:CO to provide a blend of synthesis gas having a third molar ratio of $H_2$:CO that is between the first and second molar ratios. A non-catalytic water gas shift reaction increases the molar ratio of $H_2$:CO to a fourth molar ratio that is higher than the third molar ratio, and can be about equal to or greater than the first molar ratio without supplying external heat.

19 Claims, 3 Drawing Sheets

PROCESS USING NATURAL GAS PARTIAL OXIDATION TO CONDITION SYNGAS FROM GASIFICATION OF OTHER FUELS

RELATED APPLICATIONS

This application claims the benefit of U.S. Provisional Application 61/981,876, filed 21 Apr. 2014, the disclosure of which is incorporated by reference.

FIELD OF THE INVENTION

This invention relates to a process using natural gas partial oxidation to condition synthesis gas from gasification of other fuels.

BACKGROUND OF THE INVENTION

For conversion of synthesis gas to transportation fuels, conventional Fischer Tropsch (FT) or MTG (Methanol to Gasoline) type processes usually require hydrogen ($H_2$) to carbon monoxide (CO) molar ratios of about 1.8-2.1. This compares to $H_2$:CO ratios of about 0.5 typical for synthesis gas from coal gasification and about 1.0 for biomass gasification. Thus, significant reprocessing (including catalytic sour-shift and carbon monoxide-sulfur (COS) hydrolysis) of such synthesis gas products with low $H_2$:CO ratio is required to increase the $H_2$:CO ratios to the desired 1.8-2.1 range. For Fischer Tropsch processes using specific iron catalysts, a lower $H_2$:CO ratio of about 1-1.2 is acceptable, but leads to:
- Significantly lower "per pass $H_2$ and CO conversions" to desirable liquid products which (i) increases the extent of recycle of unconverted syngas to the Fischer Tropsch reactor and (ii) requires additional reforming, either autothermal reforming (ATR) or steam methane reforming (SMR) of a part of the recycle gas.
- Significantly higher production of carbon dioxide via shift reaction $$CO + H_2O(steam) \rightarrow CO_2 + H_2$$

For a cobalt-based Fischer Tropsch catalyst, the key reaction is 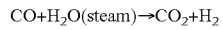 with relatively high carbon utilization. In contrast, for iron-based Fischer Tropsch catalysts, the carbon utilization is significantly reduced due to the formation of carbon dioxide as a byproduct, as the overall reaction is:

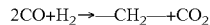

For the conversion of natural gas to FT-diesel using a catalytic ATR-type syngas generation process where natural gas is reacted with steam and oxygen, it is necessary to recycle a relatively large amount of $CO_2$-rich unconverted syngas from the Fischer Tropsch unit to the ATR unit. This significantly increases the (1) amount of oxygen required for the ATR operation and (2) ATR reactor volume.

With regard to the production of liquid fuels for coal or biomass (coal to liquid, CTL or biomass to liquid, BTL), typical net thermal efficiencies are relatively low compared to those for natural gas to liquid (GTL):
- For a Fischer Tropsch process, typical efficiency (lower heating value, LHV basis) for CTL/BTL is about 47-49% with $CO_2$ capture. For GTL the value is about 55-58%.
- For a CTL/BTL-methanol to gasoline process, typical LHV efficiency is about 53-54% with carbon capture compared to 62-65% for GTL-methanol to gasoline.

Coal gasification typically produces synthesis gas with a $H_2$:CO molar ratio too low for integrated gasification combined cycle (IGCC)-based power production or for synthesis reactions to chemicals and fuels with carbon capture, requiring the use of expensive catalytic sour and/or sweet shift reactors to increase the $H_2$:CO molar ratio of the synthesis gas before use. There is a need or desire to reduce the use of these expensive processes.

SUMMARY OF THE INVENTION

The method of the invention uses high temperature natural gas-based synthesis gas to reheat the high moisture gasification synthesis gas to shifting temperatures, reducing or eliminating the need for downstream shift reactors while increasing the amount of synthesis gas available and reducing the proportion of fuel carbon (coal+natural gas) converted to $CO_2$. The method includes the steps of providing a first stream of hot natural gas-based synthesis gas having a first molar ratio of hydrogen to carbon monoxide ($H_2$:CO), providing a second stream of quenched synthesis gas having a second molar ratio of $H_2$:CO that is lower than the first molar ratio of $H_2$:CO, and feeding the first and second streams of synthesis gas to a thermal shift unit. While in the thermal shift unit, the first and second steams of synthesis gas are blended together to form a blend of synthesis gas to raise the molar ratio of $H_2$:CO to a third molar ratio of $H_2$:CO that is between the first and second molar ratios of $H_2$:CO. Without supplying external heat, the blend of synthesis gas is maintained at a temperature sufficient to apply a water gas shift reaction to the blended stream of synthesis gas to raise the molar ratio of $H_2$:CO to a fourth molar ratio that is higher than the third molar ration of $H_2$:CO. The fourth molar ratio can be in between the first and third molar ratios of $H_2$:CO or can be equal or higher than the first molar ratio of $H_2$:CO. This reaction can be extended by supplying steam to the thermal shift unit that provides the moisture necessary to sustain the water gas shift reaction to raise the fourth molar ratio of $H_2$:CO to a higher level than would otherwise be accomplished.

With the foregoing in mind, it is a feature and advantage of the invention to provide a method of processing synthesis gas that combines different gas streams having higher and lower molar ratios of $H_2$:CO, and applies a water gas shift reaction to raise the molar ratio of $H_2$:CO in the blended stream to a level sufficient for various synthesis reactions to chemicals and fuels, and to reduce the requirement for subsequent catalytic sour and/or sweet shift that would otherwise be required for high-hydrogen integrated gas combined cycle (IGCC) based power production with carbon capture. The foregoing and other features and advantages of the invention will become further apparent from the following detailed description of the invention, read in conjunction with the accompanying drawings.

DETAILED DESCRIPTION OF THE INVENTION

Figure 1:
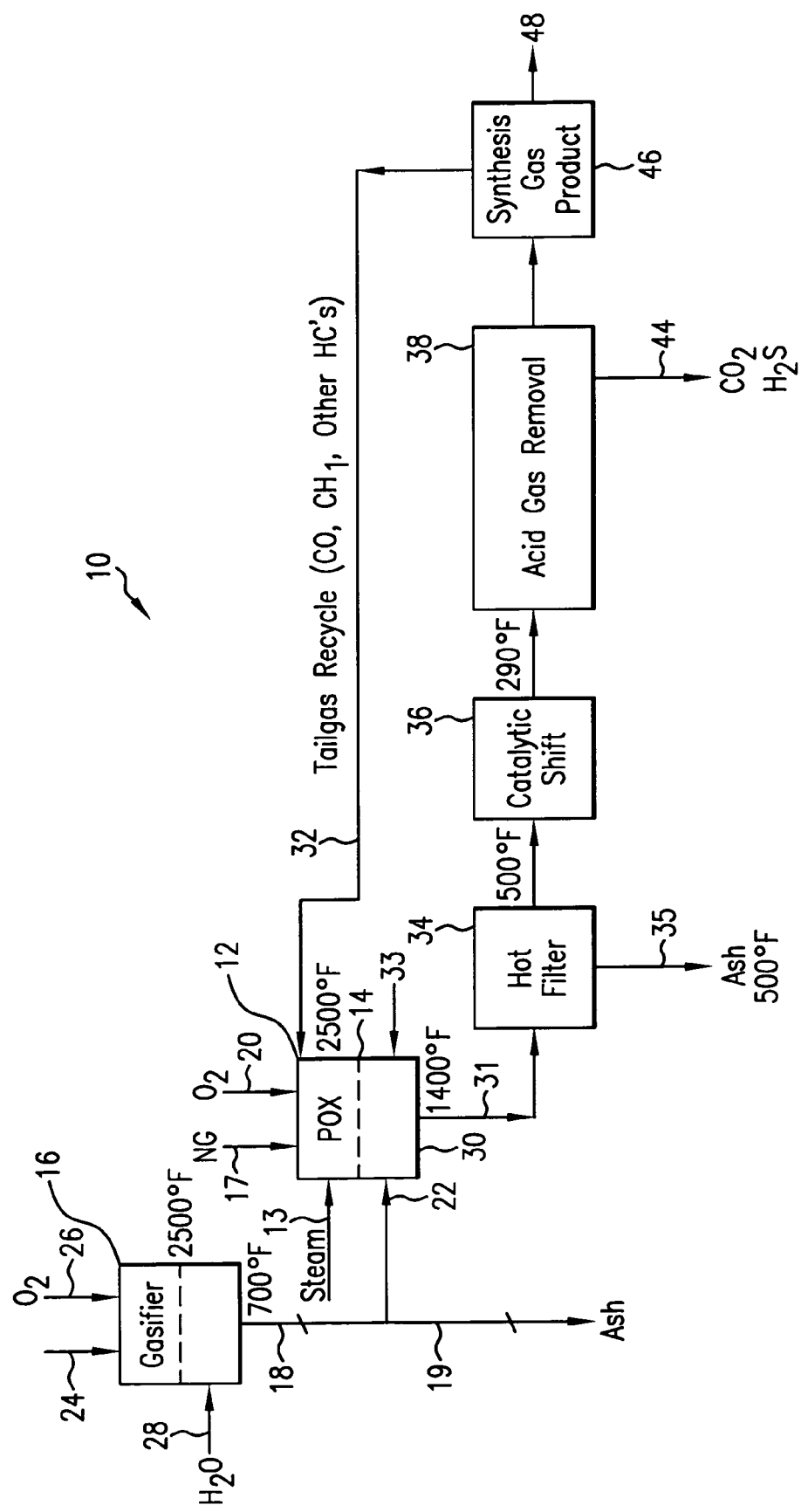
FIG. 1 schematically illustrates a first embodiment of a process useful to practice the method of the invention.

Referring to FIG. 1, a process 10 for practicing a method of processing synthesis gas is schematically illustrated. The process 10 includes a first unit 12 that serves as a natural gas-based synthesis gas thermal shift unit, for providing a first stream 14 of hot natural gas-based synthesis gas having a first molar ratio of hydrogen to carbon monoxide ($H_2$:CO). The first unit 12 can be a partial oxidizer, a steam methane reformer, or an autothermal reformer, and is suitably a partial oxidizer (PDX) as shown. The process 10 also includes a second unit 16 for providing a second stream 18 of quenched synthesis gas having a second molar ratio of $H_2$:CO that is lower than the first molar ratio of $H_2$:CO. The second unit 16 can be a coal gasifier, a biomass gasifier, a combined coal and biomass gasifier, or can be provided as separate units for the gasification of coal and biomass. Alternatively, the second unit 16 can be a gasifier for petroleum coke, municipal solid waste, refuse derived fuel, or any combination of the foregoing.

In the first unit 12, shown as a PDX, steam enters via stream 13, natural gas enters via stream 17, oxygen via stream 20, and the second stream 18 of quenched synthesis gas via stream 22. The natural gas combines with the oxygen at an elevated temperature, suitably at least about 1750° F., or at least about 2000° F., or about 2500° F., to form the natural gas-based synthesis gas having the first molar ratio of $H_2$:CO which is at least about 1.5, suitably at least about 2.0. In the second unit 16, coal, biomass, petroleum coke, municipal solid waste, and/or refuse derived fuel enters via stream 24, oxygen via stream 26, and water via stream 28. The stream 24 material can be gasified by the oxygen at temperatures of at least about 1450° F., or at least about 2000° F., suitably about 2500° F. The gasified material is quenched by the water to form the second stream 18 of quenched synthesis gas at a temperature less than about 1000° F., suitably about 700-750° F., and having a second molar ratio of $H_2$:CO which is less than the first molar ratio of $H_2$:CO and is typically less than about 0.7, but is at least about 0.2, suitably about 0.4-0.6.

The second stream 18 of quenched synthesis gas discharges its ash via stream 19 and enters the unit 12 via stream 22 where it combines with the first stream 14 of hot natural gas-based synthesis gas to form a blend 30 of synthesis gas, having the third molar ratio of $H_2$:CO that is between the first and second molar ratios of $H_2$:CO and is suitably at least about 0.7, or at least about 0.9, or at least about 1.0. The blend 30 of synthesis gas may also include products of partial oxidation of recycled tailgas from stream 32, which supplies additional carbon monoxide, methane, other hydrocarbons, and steam to the unit 12. Before exiting the unit 12, the blend 30 undergoes a water gas shift reaction to reduce the amount of CO and raise the amount of $H_2$ according to the following equation:

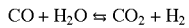

$$CO + H_2O \rightleftharpoons CO_2 + H_2$$

The water gas shift reaction favors the production of hydrogen at temperatures of about 1400° F. and higher and does not require use of a catalyst. Much of the shifting takes place as the blend 30 is exposed to heat produced from the partial oxidation of natural gas to form the hot natural gas-based synthesis gas, and the slightly exothermic water gas shift reaction above. In the embodiment shown, the unit 12 also serves as a thermal shifting unit for the water gas shift reaction. The shifted syngas stream 31 exits the unit 12 at a temperature of at least about 1400° F. and a fourth molar ratio of $H_2$:CO that is higher than the third molar ratio of $H_2$:CO, suitably at least about 1.0, or at least about 1.5. Steam can also be added to the unit 12 through inlet 33, as needed, to provide additional moisture to extend the water gas shift reaction, resulting in a fourth molar ratio of $H_2$:CO that is potentially about equal to or higher than the first molar ratio of $H_2$:CO.

The synthesis gas stream 31 can then be exposed to further processing such as filtering using hot filter 34 to remove additional ash and other contaminants via outlet 35, and conventional shifting using catalytic shift unit 36 and employing a lower temperature (for example, about 500° F.) and a shifting catalyst with steam to further raise the molar ratio of $H_2$:CO. The synthesis gas stream 31 can then pass through a conventional acid gas removal unit 38 to remove hydrogen sulfide and carbon dioxide via outlet 44 before IGCC power generation or entering synthesis stage 46 for removal of trace impurities and synthesis of products such as methanol, dimethyl ether, gasoline or Fischer-Tropsch liquids for product stream 48. Unreacted syngas components exiting the synthesis stage 46 such as carbon monoxide, methane, other hydrocarbons and water vapor can be recycled back to the natural gas-based synthesis gas thermal shift unit via stream 32.

Figure 2:
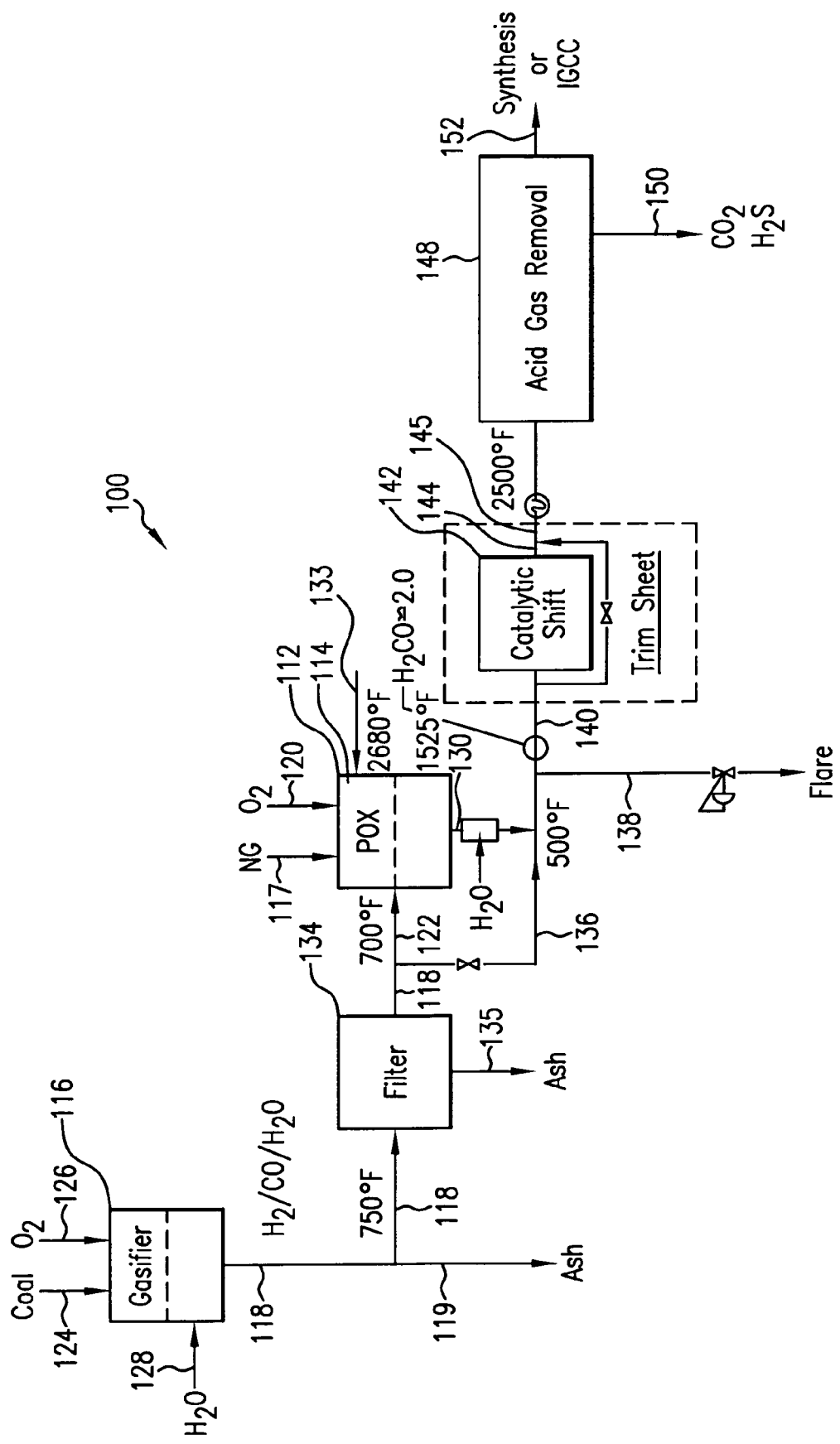
FIG. 2 schematically illustrates a second embodiment of a process useful to practice the method of the invention.
Figure 3:
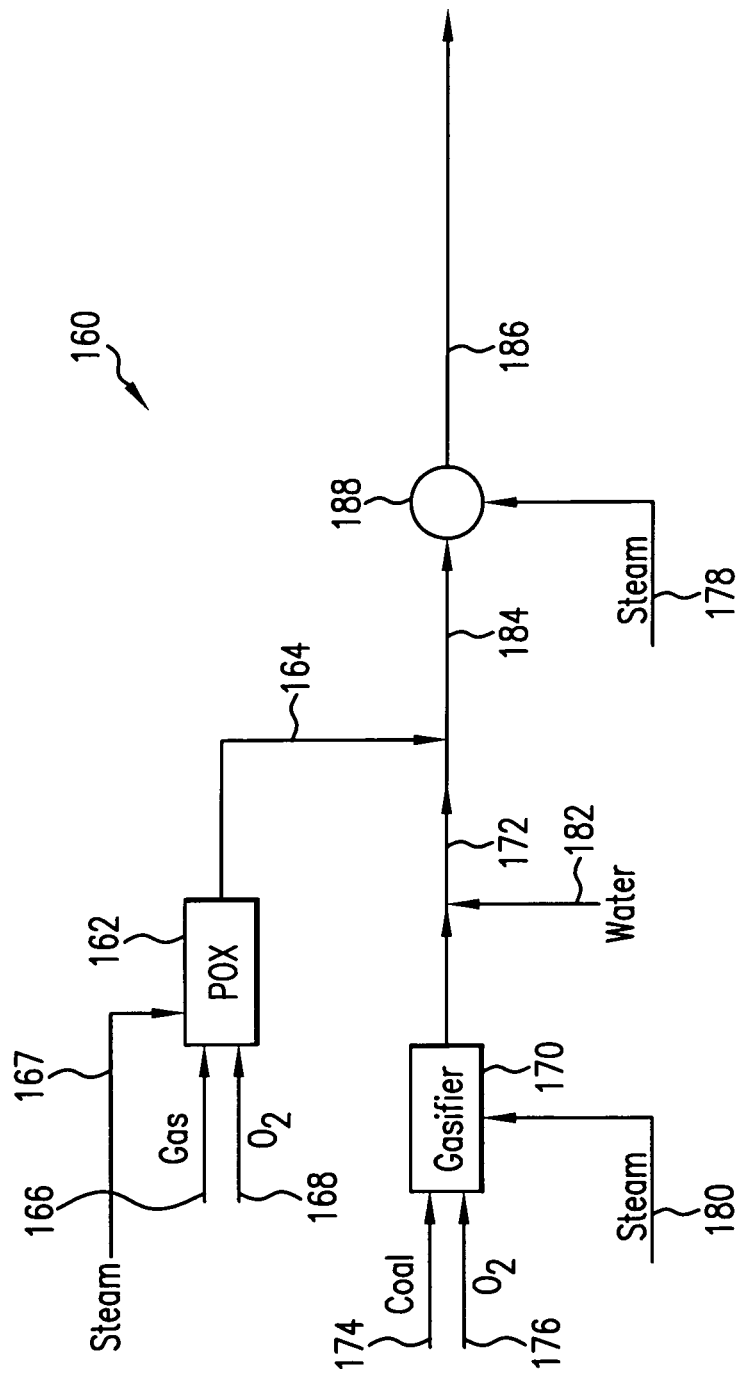
FIG. 3 schematically illustrates a third embodiment of a process useful to practice the method of the invention.

FIG. 2 schematically illustrates a second embodiment of a process 100 for practicing a method of processing synthesis gas. The process 100 includes a first unit 112 that serves as a natural gas-based synthesis gas thermal shift unit for providing a first stream 114 of hot natural gas-based synthesis gas having the above-described first molar ratio of $H_2$:CO. The first unit 112 can be a partial oxidizer (PDX), a steam methane reformer, or an autothermal reformer, and is suitably a PDX. In the embodiment of FIG. 3, like FIG. 1, the first unit 112 not only provides the first stream 114 of hot natural gas-based synthesis gas but also serves as the thermal shift unit for the water gas shift reaction applied to the blended stream 130 of synthesis gas.

The process 100 also includes a second unit 116 for providing a second stream 118 of quenched synthesis gas having a second molar ratio of $H_2$:CO that is lower than the first molar ratio of $H_2$:CO as described above. The second unit 116 can be a coal gasifier, a biomass gasifier, a combined coal and biomass gasifier, or can be provided as separate units for the gasification of coal and biomass. Alternatively, the second unit 116 can be a gasifier for petroleum coke, municipal solid waste and/or refuse derived fuel.

In the first unit 112, shown as a PDX, natural gas enters via stream 117, oxygen via stream 120, and the second stream 118 of quenched synthesis gas via stream 122. The natural gas combines with the oxygen at elevated temperatures, suitably at least about 1750° F., or at least about 2000° F., or about 2500° F., to form the natural gas-based synthesis gas having the first molar ratio of $H_2$:CO of at least about 1.5, suitably at least about 2.0. In the second unit 116, the material to be gasified enters via stream 124, oxygen via stream 126, and water via stream 128. The material can be gasified by the oxygen at temperatures of at least about 1400° F., or at least about 2000° F., suitably about 2500° F., and the gasified material is quenched by the water to form the second stream 118 of quenched synthesis gas at temperatures of less than about 1000° F., suitably about 700-750° F., and having the second molar ratio of $H_2$:CO which is typically less than about 0.7, but is at least about 0.2, suitably about 0.4-0.6.

The second stream 118 of quenched synthesis gas discharges some ash via stream 119 and passes through filter 134, where more ash is discharged through stream 135. The second stream 118 of quenched synthesis gas enters the first unit 112 at the temperature less than about 1000° F., suitably about 700-750° F., and combines with the first stream 114 of hot natural gas-based synthesis gas formed by the reaction of natural gas and oxygen, initially at a temperature of at least about 1750° F., suitably about 2500° F. or higher. The streams 114 and 118 combine in the unit 112 to form a blend 130 that has a third molar ratio of H$_2$:CO that is higher than the first molar ratio, suitably at least about 0.7, or at least about 0.9, or at least about 1.0.

Before exiting the unit 112, the blend 130 undergoes a water gas shift reaction to reduce the amount of CO and raise the amount of H$_2$. Much of the shifting takes place as the blend 130 is exposed to heat produced from the partial oxidation of natural gas to form the hot natural gas-based synthesis gas and the slightly exothermic water gas shift reaction above. The blend 130 exits the unit 112 via stream 131 at a temperature of at least about 1400° F. and a fourth molar ratio of H$_2$:CO that is higher than the third molar ratio of H$_2$:CO, suitably at least about 1.0 or at least about 1.5. Steam can also be added to the unit 112 through inlet 133, as needed, to extend the water gas shift reaction to raise the fourth molar ratio of H$_2$:CO to a level that is potentially about equal to or higher than the first molar ratio of H$_2$:CO.

Synthesis gas from exit stream 131 can then be exposed to further processing such as water addition and cooling using direct cooler 132 with water inlet 137 to condition the synthesis gas for conventional catalytic shifting using shift unit 142 and employing a lower temperature (e.g. about 500° F.) and a catalyst to further raise the molar ratio of H$_2$:CO. Synthesis gas stream 144 exiting catalytic shift unit 142 can then pass through a conventional acid gas removal unit 148 to remove hydrogen sulfide and carbon dioxide via outlet 150 before exiting through outlet 152 for use in downstream synthesis or IGCC units.

To achieve the optimum synthesis gas production and H$_2$:CO ratio for a variety of downstream uses, two variable flow bypass lines 136 and 143 can be positioned around the first (thermal shift) unit 112 and the catalytic shift unit 142. Redirecting all or part of stream 122 through bypass 137 would result in reduced natural gas and oxygen flow to first unit 112, and a redirection in PDX synthesis gas from the first unit 112. Bypass 143 around catalytic shift unit 142 can then be partly or completely closed or opened to adjust the H$_2$:CO ratio exiting the catalytic shift unit 142 by stream 144 to the desired H$_2$:CO ratio in stream 145.

FIG. 3 schematically illustrates a third embodiment 160 for practicing a method of processing synthesis gas. A first unit 162 that serves as a natural gas-based synthesis gas unit, which can be a PDX unit as shown, a steam methane reformer, or an autothermal reformer, is used to provide a first stream 164 of hot natural gas-based synthesis gas having a first molar ratio of H$_2$:CO as described above. This is accomplished by injecting natural gas through inlet 166 and oxygen through inlet 168 and reacting them under high temperature in the presence of steam (inlet 167). A second unit 170, which can be a coal gasifier, a biomass gasifier, a combined coal and biomass gasifier, separate units for the gasification of coal and biomass, or one or more gasifiers for petroleum coke, municipal solid waste, or refuse derived fuel, is used to provide a second stream 172 of quenched synthesis gas having a second molar ratio of H$_2$:CO as described above. This is accomplished by injecting coal and/or biomass in inlet 174 and oxygen in inlet 176 and reacting them in the presence of steam (inlet 180) followed by cooling with water (inlet 182) to produce the second stream 172 of quenched synthesis gas.

The first stream 164 of hot natural gas-based synthesis gas and the second stream 172 of quenched synthesis gas are combined into a blend 184 of synthesis gas having a third molar ratio of H$_2$:CO between the first and second molar rations, as described above. The blend 184 is passed to a thermal shift unit 188 (in this case, separate from the first unit 162) for applying the water gas shift reaction to the blend 184 of synthesis gas. Again, the water gas shift reaction is performed at a temperature sufficiently high to avoid the need for catalyst, suitably at least about 1400° F., or at least about 1470° F. The water gas shift reaction raises the molar ratio of H$_2$:CO to a fourth molar ratio that can be in between the first and third molar ratios, as described above. Further thermal shifting, and further raising of the molar ratio of H$_2$:CO, can be accomplished by applying more steam via inlet 178 into the thermal shift unit 188 to produce an exit stream 186 having an even higher fourth molar ratio of H$_2$:CO that is potentially equal to or higher than the first molar ratio of H$_2$:CO.

EXAMPLES

A process as shown in FIG. 3 was simulated to practice a method of processing synthesis gas. The first unit 162 was used to produce a first stream 164 of hot natural gas-based synthesis gas having the composition and flow rate indicated in Table 1 below (Stream #1). The second unit 170 was used to produce a second stream 172 of quenched synthesis gas having the indicated composition and flow rate (Stream #2). The first and second steams of synthesis gas were combined to form a blend 184 of synthesis gas having the indicated composition and flow rate (Stream #3) prior to thermal shifting. The blend 184 of synthesis gas was then exposed to non-catalytic thermal shifting conditions using thermal shift unit 188 using a temperature of about 1525° F. and a steam input from inlet 167 and the first stream 164 as shown. The experiment was repeated twice, using a) no extra steam downstream from thermal shift unit 188 (Stream #4A) and b) extra steam in the amount of 15 kg-mol/hr at 450° F. (Stream #4B).

The compositions of Streams 1, 2, 3, 4A and 4B were calculated and reported as indicated in Table 1 below. The H$_2$:CO ratio of the blend 184 of synthesis gas, initially 1.11, was increased to 1.73 in the thermal shift unit, and further increased to 2.23 by the addition of downstream steam.

TABLE 1

| | Stream # | | | | |
|---|---|---|---|---|---|
| | 1<br>Syngas<br>from NG,<br>kgmol/hr<br>(Gibbs<br>Simulation | 2<br>Syngas from<br>PRB Coal, after<br>Water Quench<br>(Aderhold Data) | 3<br>Mixed<br>Syngas to<br>Non-Catalytic<br>Shift | 4A<br>After Eq.<br>Shift<br>(Add No<br>Extra Steam) | 4B<br>Add 15<br>kgmol/hr of<br>Steam @<br>450° F. |
| Steam/Carbon (molar) | ~0.3 | | | | |
| Total Flow, kgmols/hr | 46.67 | 63.47 | 110.14 | 107.79 | 121.73 |
| Components, kgmol/hr | | | | | |

TABLE 1-continued

| | Stream # | | | | |
|---|---|---|---|---|---|
| | 1 Syngas from NG, kgmol/hr (Gibbs Simulation) | 2 Syngas from PRB Coal, after Water Quench (Aderhold Data) | 3 Mixed Syngas to Non-Catalytic Shift | 4A After Eq. Shift (Add No Extra Steam) | 4B Add 15 kgmol/hr of Steam @ 450° F. |
| Methane | 0.004 | 0.272 | 0.276 | 1.44 | 1.97 |
| H2 | 22.99 | 9.00 | 31.99 | 35.60 | 37.30 |
| CO | 12.39 | 16.47 | 28.86 | 20.55 | 16.73 |
| CO2 | 1.65 | 5.03 | 6.68 | 13.83 | 17.12 |
| H2O | 8.42 | 27.92 | 36.34 | 30.36 | 42.60 |
| N2 | 1.21 | 4.74 | 5.95 | 5.93 | 5.93 |
| COS | 0 | 0.00 | 0.00 | 0.00 | 0.00 |
| H2S | 0.005 | 0.036 | 0.041 | 0.041 | 0.041 |
| NH$_3$ | 0.004 | | 0.004 | 0.033 | 0.038 |
| H2/CO Molar | 1.86 | 0.55 | 1.11 | 1.73 | 2.23 |
| Stream Temp. F. | 2400 | 675 | 1387 | 1629 | 1552 |

Basis: 515 lb/hr of NG; PRB Coal Feed (as-is) = 1,000 lb/hr, Pressure = 400 psia The embodiments of the invention described herein are presently preferred. Various modifications and improvements can be made without departing from the spirit and scope of the invention. The scope of the invention is indicated by the appended claims, and all changes that fall within the meaning and range of equivalents are intended to be embraced therein.

We claim:

1. A method of processing synthesis gas, comprising the steps of:
   providing a first stream of natural gas-based synthesis gas provided at a temperature of at least about 1750° F. having a first molar ratio of $H_2$:CO;
   providing a second stream of synthesis gas provided at a temperature less than about 1000° F. having a second molar ratio of $H_2$:CO that is lower than the first molar ratio of $H_2$:CO;
   combining the first and second streams of synthesis gas in a thermal shift unit, and blending the first and second streams of synthesis gas to form a blend of synthesis gas having a third molar ratio of $H_2$:CO that is in between the first and second molar ratios of $H_2$:CO;
   applying a water gas shift reaction to the blend of synthesis gas to increase the molar ratio of $H_2$:CO in the blend of synthesis gas to a fourth molar ratio of $H_2$:CO that is higher than the third molar ratio of $H_2$:CO.

2. The method of claim 1, wherein the first stream of hot natural gas-based synthesis gas is provided by a partial oxidizer, steam methane reformer, or autothermal reformer.

3. The method of claim 1, wherein the second stream of quenched synthesis gas is formed by the gasification of coal.

4. The method of claim 1, wherein the second stream of quenched synthesis gas is formed by the gasification of biomass.

5. The method of claim 1, wherein the second stream of quenched synthesis gas is formed by the gasification of both coal and biomass.

6. The method of claim 1, wherein the second stream of quenched synthesis gas is formed by the gasification of petroleum coke, municipal solid waste, refuse derived fuel, or a combination thereof.

7. The method of claim 1, wherein the blend of synthesis gas has a temperature sufficiently high to cause the water gas shift reaction without using a catalyst.

8. The method of claim 7, wherein the blend of synthesis gas has a temperature of at least about 1400° F.

9. The method of claim 8, wherein the temperature of at least about 1400° F. is achieved without supplying external heat.

10. The method of claim 1, further comprising the step of supplying steam to the thermal shift unit to extend the water gas shift reaction.

11. The method of claim 1, wherein the first molar ratio of $H_2$:CO is at least about 1.5.

12. The method of claim 1, wherein the second molar ratio of $H_2$:CO is at least about 0.2.

13. The method of claim 1, wherein the third molar ratio of $H_2$:CO is at least about 0.7.

14. The method of claim 1, wherein the fourth molar ratio of $H_2$:CO is at least about 1.0.

15. A method of processing synthesis gas, comprising the steps of:
   providing a first stream of natural gas-based synthesis gas provided at a temperature of at least about 1750° F. having a first molar ratio of $H_2$:CO of at least about 1.5;
   providing a second stream of synthesis gas provided at a temperature less than about 1000° F. having a second molar ratio of $H_2$:CO that is at least about 0.2;
   feeding the first and second streams of synthesis gas to a thermal shift unit, and blending the first and second streams of synthesis gas to form a blend of synthesis gas having a third molar ratio of $H_2$:CO that is at least about 0.7; and
   applying a water gas shift reaction to the blend of synthesis gas to increase the molar ratio of $H_2$:CO in the blend of synthesis gas to a fourth molar ratio of $H_2$:CO that is at least about 1.0.

16. The method of claim 15, wherein the first stream of hot natural gas-based synthesis gas is provided by a partial oxidizer, a steam methane reformer, an autothermal reformer, or a combination thereof.

17. The method of claim 15, wherein the second stream of hot natural gas-based synthesis gas is formed by the gasification of coal, the gasification of biomass, the gasification of coke, the gasification of municipal solid waste, the gasification of refuse derived fuel, or a combination thereof.

18. The method of claim 15, further comprising the step of supplying steam to the thermal shift unit to extend the water gas shift reaction.

19. A method of processing synthesis gas, comprising the steps of:
- providing a first stream of natural gas-based synthesis gas having a first molar ratio of $H_2$:CO of at least about 1.5 and a temperature of at least about 1750° F.;
- providing a second stream of synthesis gas having a second molar ratio of $H_2$:CO that is at least about 0.2 and a temperature less than about 1000° F.;
- feeding the first and second streams of synthesis gas to a thermal shift unit, and blending the first and second streams of synthesis gas to form a blend of synthesis gas having a third molar ratio of $H_2$:CO that is at least about 0.7; and
- raising or maintaining the temperature of the blend of synthesis gas to a level sufficient to apply a water gas shift reaction to the blend of synthesis gas and increase the molar ratio in the blend of synthesis gas to a fourth molar ratio that is at least about 1.0.

* * * * *